United States Patent

Huang et al.

[11] Patent Number: 6,134,595
[45] Date of Patent: Oct. 17, 2000

[54] NETWORK IMAGE SCAN CONTROL APPARATUS OF PUSH MODEL WITH PRE-SELECTED AREA

[75] Inventors: Cheng-Ai Huang; Douglas W. Wang, both of Hsinchu, Taiwan

[73] Assignee: Waytech Development, Inc., Hsinchu, Taiwan

[21] Appl. No.: 09/113,499

[22] Filed: Jul. 10, 1998

[51] Int. Cl.[7] .................................................. G06F 15/16
[52] U.S. Cl. ...................... 709/229; 709/217; 709/321; 707/520; 707/10
[58] Field of Search .................................... 709/226, 217, 709/202, 200, 301, 203, 229, 321; 707/520, 10

[56] References Cited

U.S. PATENT DOCUMENTS

| | | | |
|---|---|---|---|
| 4,774,569 | 9/1988 | Morton et al. | 348/107 |
| 4,922,350 | 5/1990 | Rombola et al. | 358/488 |
| 5,153,645 | 10/1992 | Hasegawa et al. | 399/183 |
| 5,191,442 | 3/1993 | Bar-Lev et al. | 358/453 |
| 5,301,244 | 4/1994 | Parulski | 382/319 |
| 5,473,740 | 12/1995 | Kasson | 395/134 |
| 5,499,108 | 3/1996 | Cotte et al. | 358/400 |
| 5,659,164 | 8/1997 | Schmid et al. | 235/375 |
| 5,720,013 | 2/1998 | Uda et al. | 395/114 |
| 5,911,044 | 6/1999 | Lo et al. | 709/203 |
| 5,913,072 | 6/1999 | Wieringa | 710/12 |

*Primary Examiner*—Zarni Maung
*Assistant Examiner*—Saleh Najjar
*Attorney, Agent, or Firm*—Rosenberg, Klein & Lee

[57] ABSTRACT

The present invention discloses a network scan control apparatus connected to a server computer of a network through a computer interface for transmitting, in a push model, an image scan data obtained by an image scanner to a client computer on the network. The network scan control apparatus comprises a computer interface controller and a user interface connected to the computer interface controller. The user interface is provided with an input/output device for inputting instructions and data and displaying messages. The network scan control apparatus further comprises a scan area select mechanism connected to the computer interface controller for selecting an area of a document to be scanned. The present invention enables sharing of an image scanner on a network and enhances resource utilization of the image scanner.

4 Claims, 7 Drawing Sheets

NETWORK IMAGE SCAN CONTROL APPARATUS OF PUSH MODEL WITH PRE-SELECTED AREA

FIELD OF THE INVENTION

The present invention relates to utilization of network peripheral resources. More particularly, the present invention relates to a network-sharing image scan.

BACKGROUND OF THE INVENTION

An image scanner has become a basic peripheral apparatus for a computer. On the other hand, a local area network (LAN) has been widely used. Therefore, full utilization of resources is an important issue for the network technology. However, heretofore, an image scanner can only serve a single computer so that the image scanner can hardly be integrated with a network to serve all client computers in the network. That is, the utilization of the resources cannot be enhanced, resulting in limitation of distribution and processing of image information.

Generally, an image scanner can be used on a network only in an indirect manner. First, a user has to leave his own computer and to locate a computer which is idle and is connected to an image scanner. After an image is scanned, the scanned image file should be taken back to the user's computer by a recording medium or transmitted to the user's computer by uploading the file to a network. During the use of the image scanner, the computer connected to the image scanner is appropriated so that it is inconvenient for a user of this computer.

Therefore, it is desirable to devise a scheme to overcome the prior art drawback mentioned above.

SUMMARY OF THE INVENTION

It is an object of the present invention to provide a network image scan control module which enables sharing of a single image scanner on a network.

It is another object of the present invention to provide a network image scanner which can select an area to be scanned by a user.

It is a further object of the present invention to provide a network image scan control apparatus of push model, without interfering any computers on a network during its operation.

It is a yet further object of the present invention to provide a scan area select mechanism in which an area to be scanned can be easily defined or selected by a user.

According to the present invention, a network scan control apparatus comprises a computer interface controller and a user interface connected to the computer interface controller. The user interface is provided with an input/output device for inputting instructions and data and displaying messages. The network scan control apparatus is connected to a server computer of a network through a computer interface and transmits in a push model an image scan data to a client computer on the network so that an image scanner can be shared on the network, thereby enhancing resource utilization of the image scanner.

The network scan control apparatus also comprises a scan area select mechanism connected to the computer interface controller for selecting an area of a document to be scanned. In one embodiment of the present invention, the scan area select mechanism comprises a sliding rod, pointing elements, a position switch and an encoder. The pointing elements are slidable along the sliding rod to define the area to be scanned and provide it to the position switch through a transmission mechanism. Then, the area to be scanned is converted into a scan area selection data by the encoder.

These and other objects, features and advantages of the present invention will become apparent to those skilled in the art upon consideration of the following description of the preferred embodiments of the present invention taken in conjunction with the accompanying drawings

DETAILED DESCRIPTION

The following description will be made to the preferred embodiments of the present invention with reference to the accompanying drawings.

Figure 1:
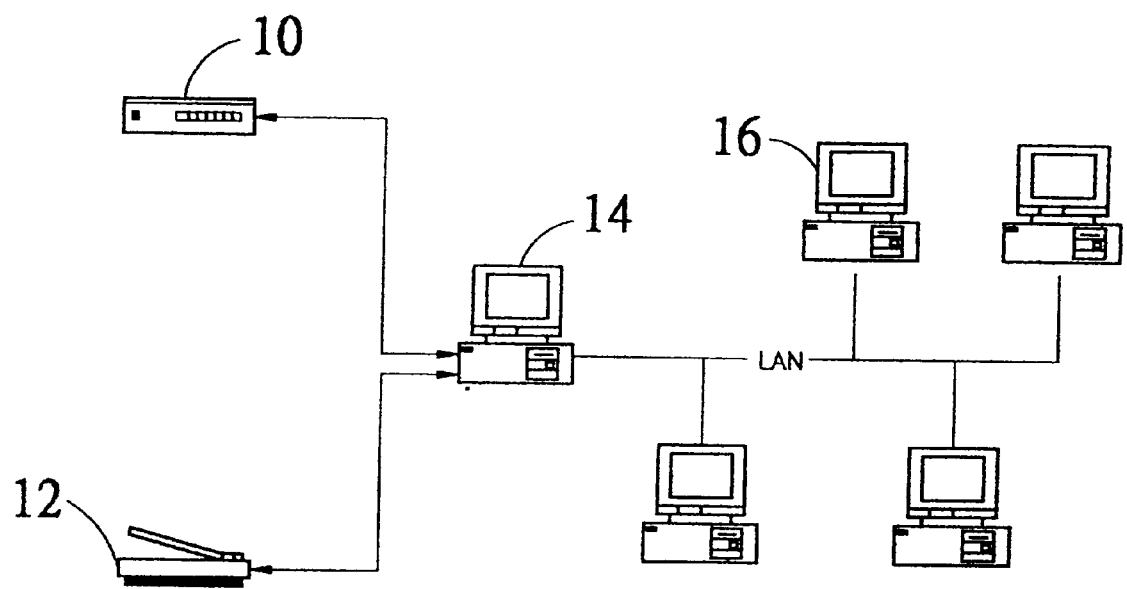
FIG. 1 shows a network scan control apparatus used on a network according to an embodiment of the present invention in which the network scan control apparatus is added on the network.

FIG. 1 shows an add-on embodiment of the present invention. Both of a network scan control apparatus 10 and an image scanner 12 are connected to a server computer 14, which in turn is connected to a plurality of client computers 16 through a local area network, wherein the network scan control apparatus 10 is connected to the server computer 14 through a computer interface. The computer interface can be a serial bus, a parallel bus, a universal serial bus (USB) or any other suitable bus. The image scanner 12 is managed by the network scan control apparatus 10, and image data scanned by the image scanner can be transmitted to anyone of the client computers 16 via the server computer 14 and the local area network.

During operation, a document to be scanned is put on the image scanner 12, and then a command for performing image scanning is issued from the network scan control apparatus 10 and transmitted in a push model to the desired client computer 16. Such a push model is contrary to the mode used in an ordinary printer on a network wherein data to be printed are pushed into the printer from respective client computers on the network. In contrast, according to the present invention, the image scan data are discretely pushed to the respective client computers 16 on the network from the traditional image scanner 12 by the presented network scan control apparatus.

In the network shown in FIG. 1, only one image scanner is necessary for serving the whole network without interfering any computers during image scanning.

Figure 2:
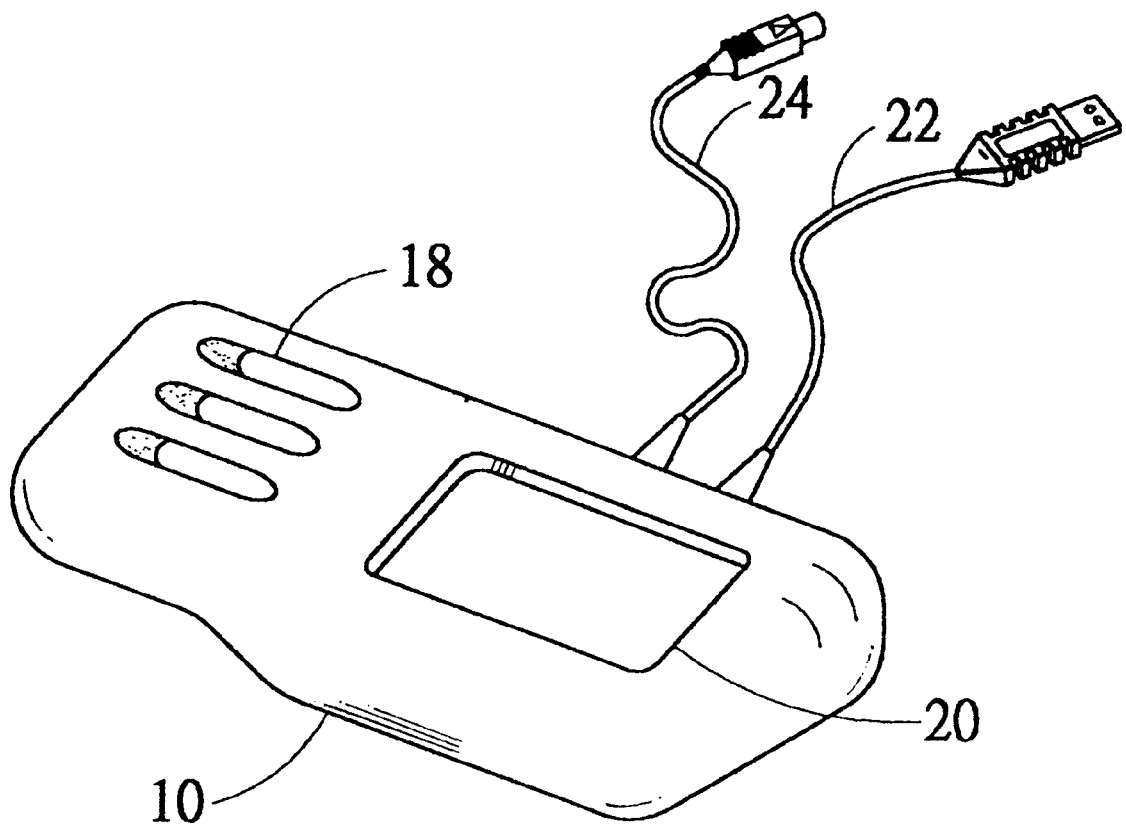
FIG. 2 is a perspective view showing the network scan control apparatus.

FIG. 2 is a perspective view showing the network scan control apparatus 10. Keys 18 for inputting operation instructions such as scanning, image data transmission and image data cancel, and a display 20 for displaying an inputted instruction or the current status of the network scan control apparatus 10 are provided on the network scan control apparatus 10. The network scan control apparatus 10 is provided with two buses 22 and 24. The bus 24 is used to transmit scan area data defined by a user, which will be described later. The network scan control apparatus 10 is connected to the server computer 14 shown in FIG. 1 through the bus 22 to manage and operate the image scanner 12. In the present embodiment, the scanned image data can be easily pushed to the client computer by pressing one of the keys 18.

Figure 3:
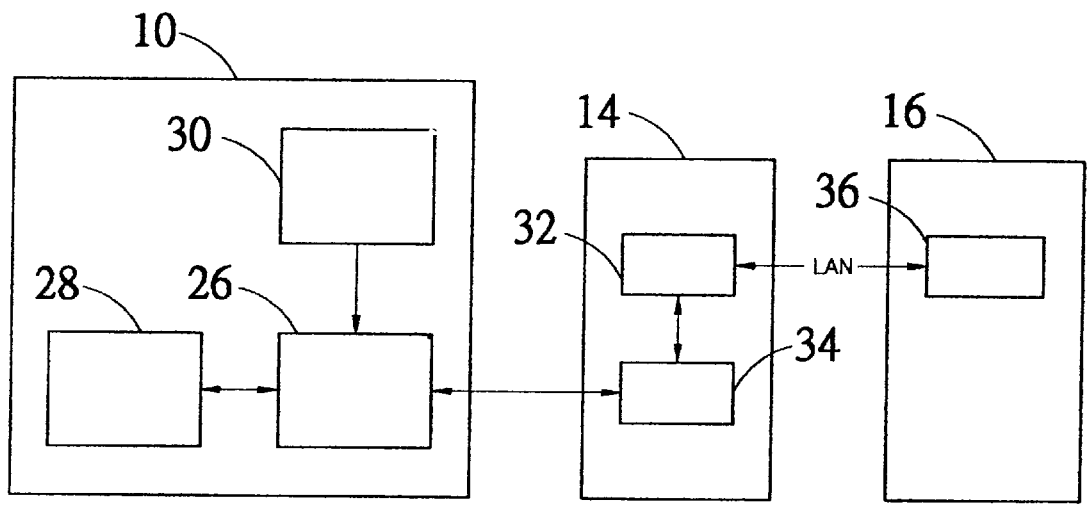
FIG. 3 is a schematic view showing the constitution of the network scan control apparatus.

The constitution and operation of the network scan control apparatus 10 are shown in FIG. 3. The network scan control apparatus 10 comprises a computer interface controller 26, a user interface 28 and a scan area select mechanism 30. The user interface 28 interfaces between a user and the network scan control apparatus 10, and it is exampified by the keys 18 and the display 20 shown in FIG. 2. The scan area select mechanism 30 is used to select an area of a document to be scanned. In some cases, only a portion of an image on a document is desired, and thus the scan area select mechanism 30 is used to select the desired area and informs the computer interface controller 26 of the area. The computer interface controller 26 communicates with the server computer 14 via a peripheral interface, and transmits the scanned image data to a scan client application 36 in the client computer 16 by use of a scan server application 32 and a scan server driver 34.

Figure 4:
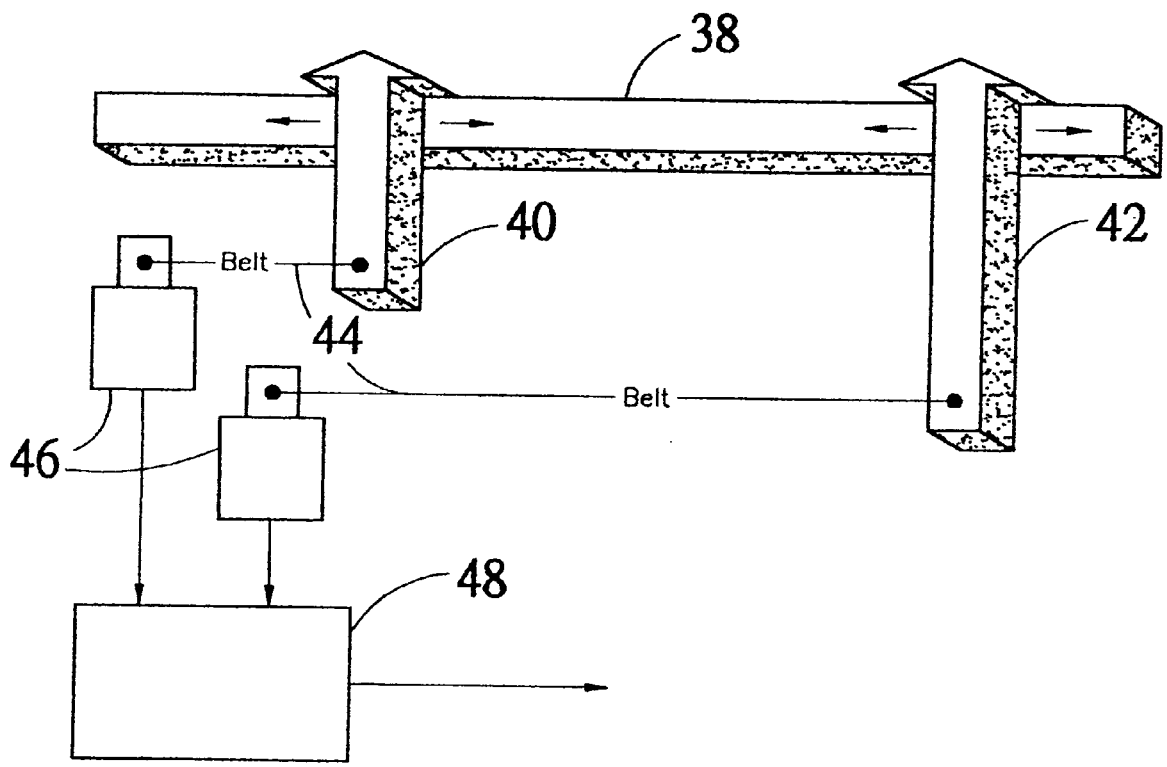
FIG. 4 is a schematic view showing a scan area select mechanism.

The scan area select mechanism 30 is shown in FIG. 4. As shown, a sliding rod 38 is provided with slidable pointing elements 40 and 42 for defining the scan area. For example, the scan area is defined between the pointing element 40 and the pointing element 42 when the former points a start scan position and the latter points an end scan position. Preferably, the sliding rod 38 and the pointing elements 40 and 42 are intimately provided on a scanning platform of the image scanner 12.

A rotary switch 46 which is a position switch is driven by the pointing elements 40 and 42 through a belt 44. The positioning information of the switch is transmitted to an encoder 48 and encoded into a scan area selection data, which is then sent to the computer interface controller 26 shown in FIG. 3. The rotary switch 46 and the encoder 48 are widely known and the description thereof will be omitted.

Figure 5:
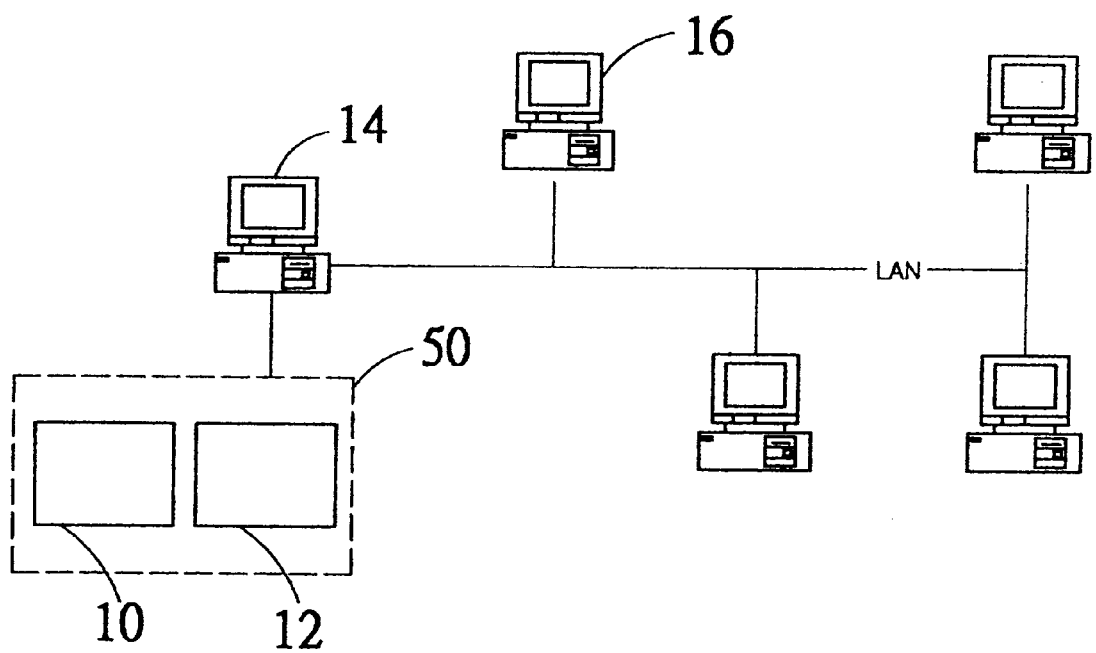
FIG. 5 and FIG. 6 show a network scan control apparatus used on a network according to another embodiment of the present invention in which the network scan control apparatus is integrated with an image scanner
Figure 6:
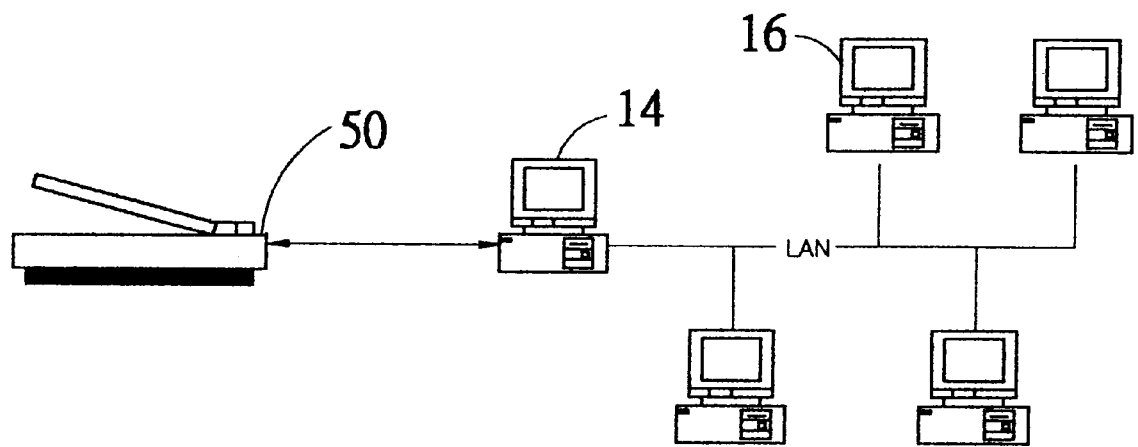

FIG. 5 shows another embodiment of the present invention in which a network scan control apparatus 10 is integrated to be a module with an image scanner 12 to form a network scanner 50. In the embodiment shown in FIG. 1, the network scan control apparatus 10 is added on the existing equipment, and only the network scan control apparatus 10 is additionally incorporated for a network provided with an image scanner, while in the embodiment shown in FIG. 5, the network scanner is incorporated into a network. The operation of the embodiment shown in FIG. 5 is the same as that in FIG. 1 and will not be further explained. However, buses used by the network scan control apparatus 10 and image scanner 12 in the network scanner 50 can be integrated into one. FIG. 6 is a schematic view showing the configuration thereof.

Figure 7:
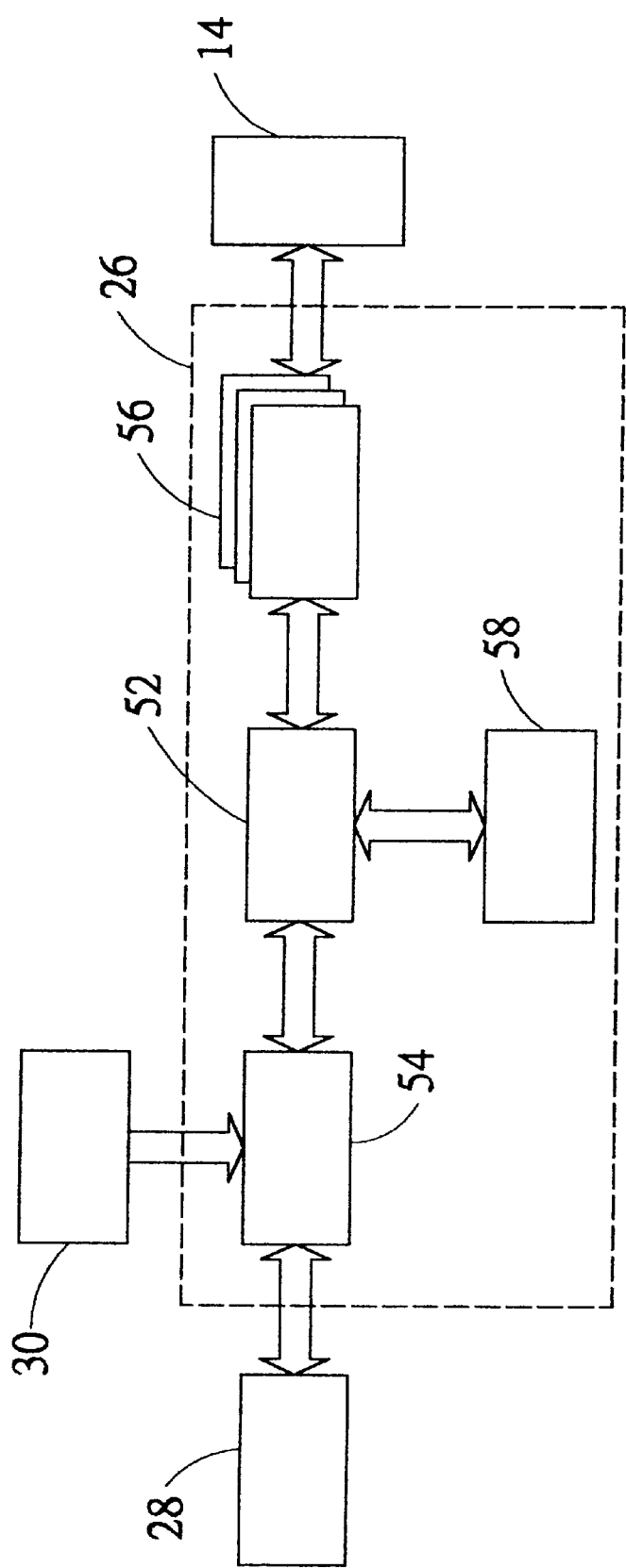
FIG. 7 is a schematic view showing a computer interface controller.

The computer interface controller 26 mentioned above can be implemented by a microcontroller or a chip set. FIG. 7 shows the constitution thereof. The computer interface controller 26 comprises a microprocessor 52 for controlling the operation of the computer interface controller 26, an input/output logic for communicating with the user interface 28 and the scan area select mechanism 30, a computer interface logic 56 for communicating with external computers, and a memory 58 such as an erasable programmable read only memory (EPROM) for storing program instructions or data for the microprocessor 52.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A network scan control apparatus for transmitting, in a push model, an image scan data obtained by an image scanner to a client computer on a network connected to said scanner, said apparatus comprising:

a computer interface controller connected to a server computer on said network through a computer interface;

a user interface connected to said computer interface controller, said user interface being provided with an input/output device for inputting instructions and data and displaying messages; and, a scan area select mechanism for selecting an area of a document to be scanned, said scan area select mechanism being connected to said computer interface controller, said scan area select mechanism including:
a sliding rod;
a pair of pointing elements slidable along said sliding rod for defining said area to be scanned;
a position switch connected to said pointing elements through a transmission mechanism for sensing positions of said pointing elements and providing an output signal; and
an encoder for encoding said output signal from said position switch into an area selection data.

2. The apparatus according to claim 1, wherein said position switch is a rotary switch and said transmission mechanism is a belt.

3. An image scan sharing network for transmitting, in a push model, an image scan data obtained by an image scanner to a client computer on said network, said network comprising:

a server computer for serving said network;
said image scanner connected to said server computer;
a plurality of said client computer connected to said server computer through a local area network;
a network scan control module connected to said server computer through a computer interface, said network scan control module including (a) a computer interface controller connected to said server computer through said computer interface, and (b) a user interface connected to said computer interface controller, said user interface being provided with an input/output device for inputting instructions and data and displaying messages; and,
a scan area select mechanism for selecting an area of a document to be scanned, said scan area select mechanism being connected to said computer interface controller, said scan area select mechanism including:
a sliding rod;
a pair of pointing elements slidable along said sliding rod for defining said area to be scanned;
a position switch connected to said pointing elements through a transmission mechanism for sensing positions of said pointing elements and providing an output signal; and
an encoder for encoding said output signal from said position switch into an area selection data.

4. The network according to claim 3, wherein said position switch is a rotary switch and said transmission mechanism is a belt.

* * * * *